United States Patent [19]

Ruffini et al.

[11] Patent Number: 5,183,521
[45] Date of Patent: Feb. 2, 1993

[54] PROCESS AND APPARATUS FOR PRODUCING SPLINED DRIVING BELTS

[75] Inventors: Alberto Ruffini; Nicolino Mammarella, both of Chieti, Italy

[73] Assignee: Pirelli Trasmissioni Industriali S.p.A., Chieti, Italy

[21] Appl. No.: 688,281

[22] Filed: Apr. 22, 1991

[30] Foreign Application Priority Data

Apr. 24, 1990 [IT] Italy .................. 20115 A/90

[51] Int. Cl.⁵ .................................................. F16G 5/00
[52] U.S. Cl. ........................................ 156/142; 83/875; 156/268; 156/510
[58] Field of Search .............. 264/138, 146, 147, 162; 156/137, 139, 268, 510; 474/142, 265; 425/289, 306, 307; 83/861, 875, 877, 563

[56] References Cited

U.S. PATENT DOCUMENTS

| | | | |
|---|---|---|---|
| 1,401,480 | 12/1921 | King | 156/142 |
| 1,473,642 | 11/1923 | Reichel | 83/418 |
| 1,935,817 | 11/1933 | Reynolds | 156/138 |
| 3,335,624 | 8/1967 | Cline | 82/117 |
| 3,607,502 | 9/1971 | Marzocchi et al. | 156/142 |
| 3,615,988 | 10/1971 | Richmond et al. | 156/142 |
| 3,869,933 | 3/1975 | Dorf | 474/265 |
| 3,930,417 | 1/1976 | Ballou | 474/265 |
| 4,177,688 | 12/1979 | Howerton et al. | 156/137 |
| 4,231,826 | 11/1980 | Wrast et al. | 156/142 |
| 4,379,011 | 4/1983 | Henderson | 156/142 |
| 4,464,148 | 8/1984 | Tanaka et al. | 474/238 |
| 4,496,269 | 1/1985 | Hetz | 409/132 |
| 4,534,102 | 8/1985 | Hetz | 29/558 |
| 4,534,687 | 8/1985 | Hetz | 409/157 |
| 4,656,910 | 4/1987 | Peterson | 83/875 |
| 4,717,295 | 1/1988 | Hetz | 409/132 |

FOREIGN PATENT DOCUMENTS

| | | |
|---|---|---|
| 0034225 | 8/1981 | European Pat. Off. |
| 2-89628 | 3/1990 | Japan .................. 156/142 |
| 2098911 | 12/1982 | United Kingdom |

Primary Examiner—Jay H. Woo
Assistant Examiner—Robert B. Davis
Attorney, Agent, or Firm—Stevens, Davis, Miller & Mosher

[57] ABSTRACT

A method and apparatus for producing splined driving belts from a flexible annular element of vulcanized rubber, having a flattened rectangular section and mounted around two support rollers operated in rotation so as to move the annular element according to the direction of its longitudinal extension. A first set of knives transversely penetrates into the annular element for producing one series of longitudinal cuts parallel to the annular element according to a predetermined depth and in an inclined direction relative to the perpendicular line of an operating surface of the annular element itself and a second set of knives produces a second series of longitudinal mutually-parallel cuts inclined with respect to the cuts of the first series so as to form a series of longitudinal grooves in the annular element.

13 Claims, 2 Drawing Sheets

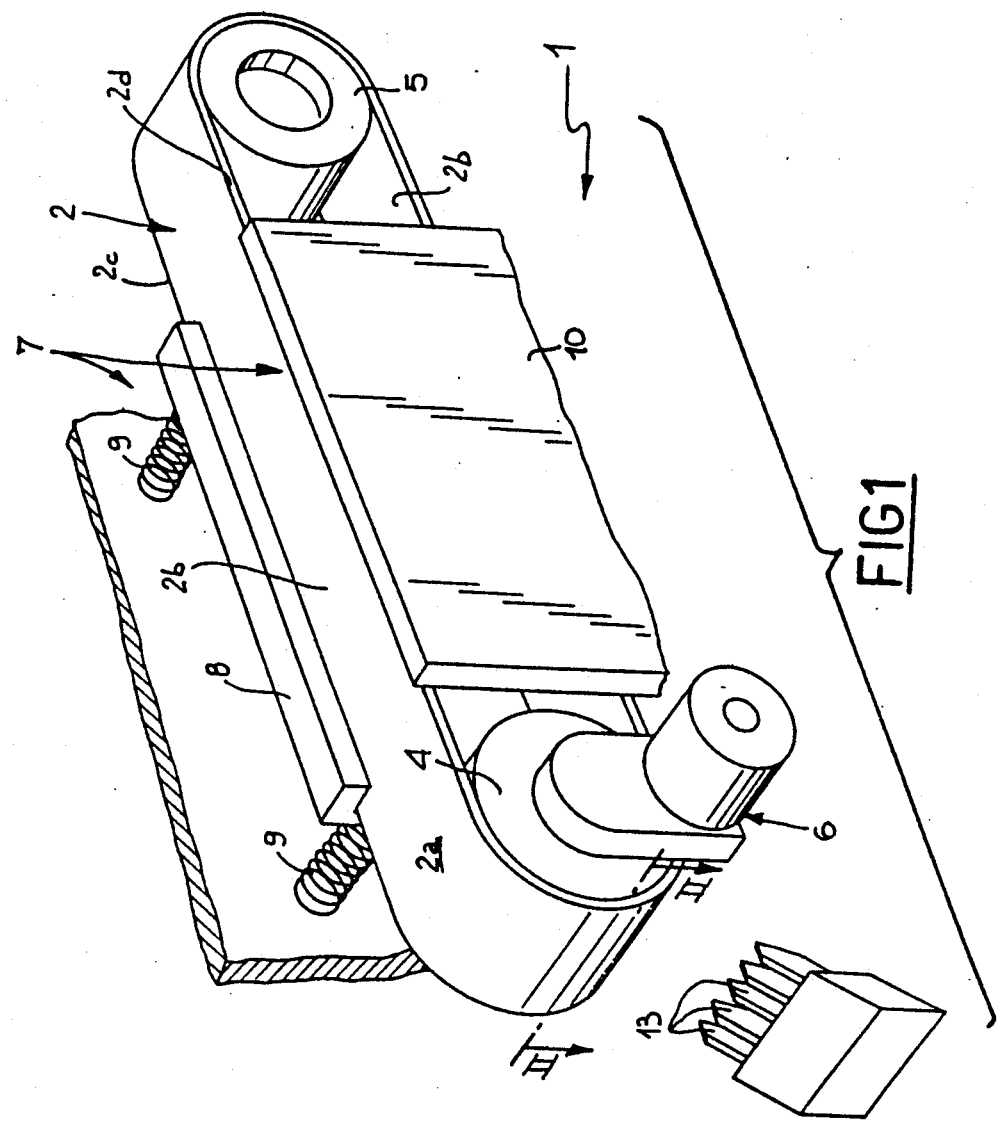
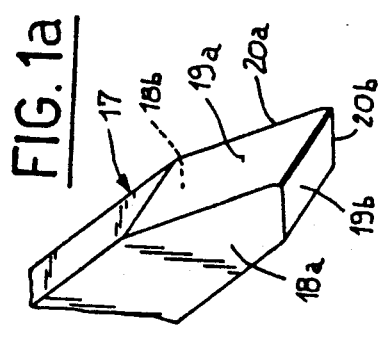
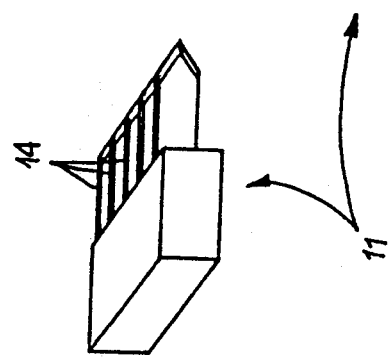

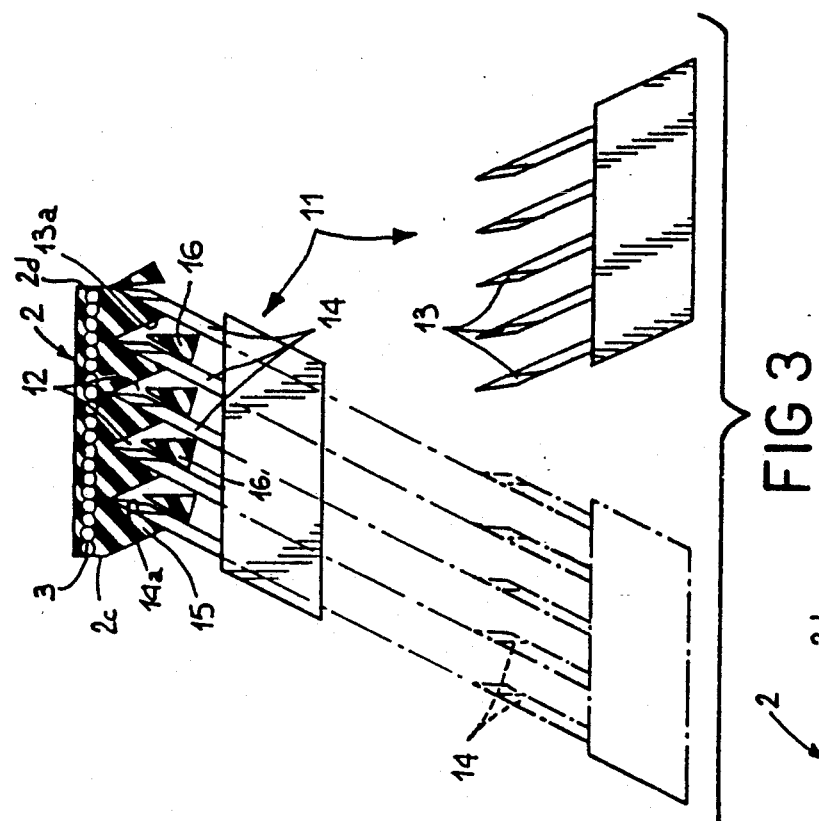
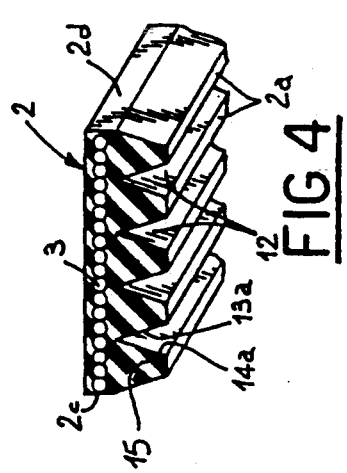
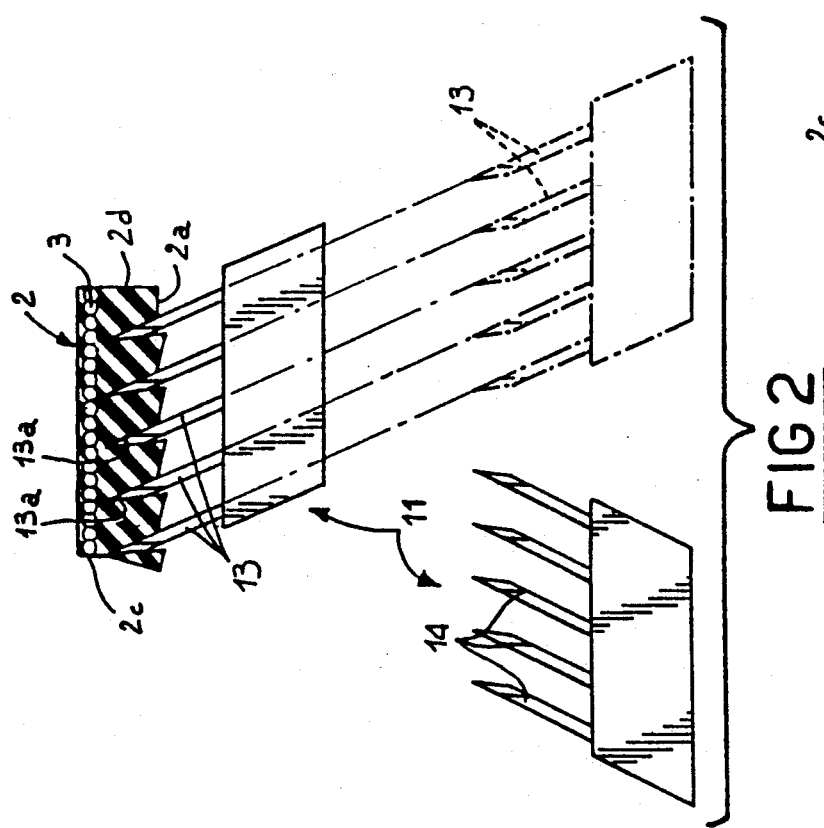

PROCESS AND APPARATUS FOR PRODUCING SPLINED DRIVING BELTS

BACKGROUND OF THE INVENTION

The present invention relates to a process and apparatus for producing splined driving belts, the process being of the type comprising the steps of:
  making a flexible annular element of an elastomeric vulcanized material having a flattened rectangular section and incorporating at least a textile reinforcing layer extending parallelly to the major sides of said section to a predetermined distance from an operating surface defined by at least one of said major sides of the extension of the flexible annular element;
  mounting the flexible annular element to at least a support roller;
  moving the flexible annular element with a uniform movement in the direction of its longitudinal extension by driving in rotation said at least one support roller;
  removing the elastomeric material from the flexible annular element for producing a number of longitudinal grooves on said operating surface.

The above process is is accomplished by an apparatus of the type comprising:
  at least a support roller designed to operatively engage a flexible annular element of vulcanized rubber having a flattened rectangular section and incorporating at least a textile reinforcing layer extending parallelly to the major sides of said rectangular section to a predetermined distance from an operating surface defined by at least one of said major sides on the extension of the flexible annular element;
  actuator means designed to drive in rotation said at least one support roller so as to move the flexible annular element in the direction of its longitudinal extension;
  cutting means designed to act on the operating surface of the annular element in order to produce a number of parallel grooves extending over the whole longitudinal extension of the annular element itself.

The process can be applied in order to make at least a split on the belt or to form a single belt with several splits or several belts disposed in side-by-side relation with the respective splits.

It is known that splined driving belts essentially consist of an annular element made of vulcanized rubber of substantially flattened rectangular section and incorporating a textile reinforcing layer extending parallelly to the major sides of said section.

Formed on one operating surface of the annular element defined by the extension of one of the major sides of its section, is a plurality of longitudinal parallel grooves which are generally in the form of "V" and are spaced apart from each other by the same distance.

The presence of these grooves gives rise to corresponding ribs which are in the form of "V" too.

The ribs are designed to be accommodated into respective grooves formed in the pulleys to which the belt will be mounted for use.

Presently there are different methods for producing belts of the above described type.

One of these methods is described in U.S. Pat. No. 3,893,116 according to which provision is made for winding in succession one layer made of raw elastomeric material, a textile reinforcing layer and a second layer made of raw elastomeric material on a cylindrical matrix of vulcanized rubber, provided with parallel ribs on the outer surface thereof.

Subsequently a vulcanization step is carried out during which the semifinished product is pressed against the matrix.

Under this situation the ribs exhibited by the matrix penetrate into the first elastomeric layer thereby giving rise to a plurality of circumferential grooves on the inner surface of the vulcanized product.

The vulcanized product is then disengaged from the matrix and, if necessary, split into several parts on the circumferential extension thereof so as to give rise to a number of driving belts of the desired width.

However the methods of the above described type have some drawbacks resulting from the fact that it is rather difficult to control the burying of the raw elastomeric material into the matrix ribs. It is therefore difficult to achieve a very precise and accurate working on the finished belts.

In greater detail it is to be pointed out that above all when belts of small-sized section are manufactured, it is difficult to obtain precise size features for the grooves as well as an exact positioning of the textile reinforcing element in the belt section.

In this connection it is to be pointed out that the groove configuration is of the greatest importance for achieving a correct behaviour of the belt when in use on the respective pulleys.

At the same time, the positioning of the textile reinforcing element is also of the greatest importance for the correct distribution of the efforts that the belt must undergo under use conditions.

In addition a further drawback of the described methods resides in that the availability of a great number of matrices is necessary in order to make belts having the required different configurations and size characteristics in compliance with the market needs.

Another fact to be taken into due account is that the production processes of the above type are rather complicated and consequently bring about an increase in the manufacturing cost.

According to another method described in U.S. Pat. No. 4,332,576 used for the production of splined belts, the manufacture of the flexible annular element designed to constitute the finished belt is first carried out, said element consisting of two or more layers of elastomeric material incorporating at least a layer of textile reinforcing material therebetween.

When the elastomeric material is still in a raw state, the flexible annular element is engaged between two mutually spaced apart pulleys between which two moulding units are arranged each designed to operate on one of the rectilinear layers exhibited by the extension of the annular element stretched between the two pulleys.

Each moulding unit substantially comprises two heated plates which can be moved close to each other in order to compress the length of the annular element interposed therebetween.

At least one of said plates, that is the one facing the inner surface of the extension of the annular element is such shaped as to produce the desired grooves on the belt which is being manufactured.

Consequently, the annular element length which is enclosed between the heated plates undergoes a moulding action simultaneously with a vulcanization action.

At the end of a predetermined lapse of time, sufficient for the elastomeric material to be vulcanized, plates are moved away from each other and, by driving the pulleys in rotation, the annular element is moved forward so that a new length of the extension thereof is located between the plates, being ready for moulding and vulcanization.

The manufacture of the belt is over when the annular element has been moulded and vulcanized over the whole extension thereof.

This production process too has the drawback that it does not allow an easy control of the penetration of the elements designed to mould the elastomeric material into the material itself.

It is consequently difficult to obtain a precise working above all when small-sized belts have to be produced.

In addition, as moulding and vulcanization are carried out repeatedly on the different lengths of the flexible annular element extension, it is rather problematic to obtain a perfectly homogeneous vulcanization degree over the whole elastomeric material forming the belt.

It is also to be pointed out that the method involves long working times and the availability of heated plates of different structural configuration for achieving the different types of belt required on the market.

Working processes are known as well in which the grooves on the operating surface of the annular element are carried out by mechanical working on the previously vulcanized elastomeric material.

In greater detail, the vulcanized annular element having a flattened annular configuration is provided to be fitted on a support roller in a reversed condition, that it in such a manner that its operating surface is located on the outer side of its circumferential extension.

Then the support roller is put in rotation and afterwards the annular element is submitted to the action of an abrasive grinding wheel the profile of which matches the shape of the profile of the grooves to be produced on the belt being worked.

This method allows more precise workings to be carried out as compared with the previously described methods, as the manufacture of grooves on previously vulcanized elastomeric material eliminates all problems connected with the difficulty of checking the deformations of the raw elastomeric material during the moulding step.

However it has been found that in this case too the accuracy of working is not completely satisfactory, above all when the groove sizes are very small. In fact the accuracy in working is tightly connected with the granulometry of the grinding wheel used, the value of which cannot be lower than certain limits.

In particular the radius of the groove bottom cannot be reduced to minimum values which would be desirable for the good operation of the belts on the pulleys.

In addition this method too has the problem that a great number of different grinding wheels are necessary for the manufacture of belts having different structure and size features.

Moreover, the abrasive action of the grinding wheels gives rise to a surface overheating which is sometimes harmful to the physical characteristics of the surface generated by the grinding operation.

Finally it is to be pointed out that the above operation is rather slow, which results in a higher cost for the product, and also involves the disadvantage of an increased noise.

SUMMARY OF THE INVENTION

The present invention substantially aims at solving the problems of the known art, by a process enabling grooves on the annular element to be carried out when the vulcanization is over, in a very practical, quick and precise manner and without the replacement of tools or the like being needed for the manufacture of belts having different sizes or structural configurations.

Furthermore, the method does not alter the physical features of the surface thus generated.

The foregoing and further objects that will become more apparent in the course of the present description are substantially attained by a process for manufacturing splined driving belts characterized in that the removal of the elastomeric material comprises the steps of:

carrying out one series of longitudinal notches on said operating surface, which notches are spaced apart from each other by the same distance and extend parallelly in the section of the annular element according to an inclined direction relative to the normal of the operating surface; and according to a depth lower than the distance between the textile reinforcing layer and the operating surface itself;

carrying out a second series of longitudinal notches on said operating surface, which notches are spaced apart from each other by the same distance, extend parallelly in the section of the annular element and are united each with one of the notches of the first series so as to form said longitudinal grooves in the flexibile annular element.

In particular the method, as shown in the following explanation, is adapted to produce grooves having a bottom radius approaching to zero.

Still in accordance with the invention, the process is put into effect by an apparatus for manufacturing splined belts, characterized in that said cutting means comprises:

one set of knives disposed parallelly in side by side relation and simultaneously movable from a rest position in which they are spaced apart from the annular element to a cutting position in which they penetrate into the operating surface of the annular element by a predetermined amount and according to an inclined direction relative to the normal of the operating surface itself;

a second set of knives disposed parallelly in side by side relation and simultaneously movable from a rest position in which they are spaced apart from the annular element to a cutting position in which they penetrate into the operating surface of the annular element by a predetermined amount and according to an inclined direction relative to the cutting direction of the first set of knives.

BRIEF DESCRIPTION OF THE DRAWINGS

Further features and advantages will be best understood from the detailed description of a preferred embodiment of a process for manufacturing splined driving belts and an apparatus for putting the process into effect, given hereinafter by way of non-limiting example with reference to the accompanying drawings, in which:

FIG. 1 is a fragmentary perspective view diagrammatically showing an apparatus for making splined belts in accordance with the process of the invention;

FIG. 1a is a fragmentary perspective view showing the cutting end of one of the knives used in the apparatus of the invention;

FIG. 2 is a fragmentary diagrammatic sectional view taken along line II—II in FIG. 1 and illustrating the profile in section, to an enlarged scale, of a belt being worked during the execution of one cutting step;

FIG. 3 shows the belt of FIG. 2 during the execution of a second cutting step;

FIG. 4 is a fragmentary sectional view in perspective showing a different type of splined belt to be produced in accordance with the invention.

DETAILED DESCRIPTION OF THE PREFERRED EMBODIMENTS

Referring particularly to FIG. 1, an apparatus for manufacturing splined driving belts in accordance with the present invention has been generally identified by reference numeral 1.

Apparatus 1 is designed to operate upon a flexible annular element 2 of vulcanized rubber having a flattened rectangular section and incorporating at least a layer formed with a plurality of cords disposed in side-by-side relation or a textile reinforcing layer 3 (FIGS. 2, 3) extending parallelly to the major sides of the section of the annular element itself to a predetermined distance from an operating surface 2a defined by at least one of the above major sides over the whole extension of the annular element 2.

The flexible annular element 2 is conventionally obtained by winding two or more layers of an elastomeric material intermediate on a drum, a layer of a textile reinforcing material 3 being interposed therebetween, and subsequently submitting the product being worked to a vulcanization process, not described as known and conventional.

In accordance with the process of the invention, apparatus 1 is conceived so that it may carry out a removal of elastomeric material from the annular element 2, said removal in accordance with the present invention being performed by the following steps:

carrying out one series of longitudinal notches on said operating surface, which notches are spaced apart from each other by the same distance and extend parallelly in the section of the annular element according to an inclined direction relative to the normal of the operating surface and according to a depth lower than the distance between the textile reinforcing layer and the operating surface itself;

carrying out a second series of longitudinal notches on said operating surface, which notches are spaced apart from each other by the same distance, extend parallelly in the section of the annular element and are joined each with one of the notches of the first series so as to form said longitudinal grooves in the flexibile annular element.

To this end apparatus 1 comprises at least one support roller 4 designed to operatively engage the flexible annular element 2. In greater detail, the presence of a first support roller 4 and a second support roller 5 is provided which have parallel and mutually spaced apart axes. As clearly shown in FIG. 1, rollers 4 and 5 are adapted to engage the flexible element 2 so that two rectilinear lengths 2b are defined on the longitudinal extension of said element.

Advantageously, the presence of two support rollers 4, 5 allows apparatus 1 to be adapted for working annular elements 2 of any length, by merely adjusting the distance between centers of said rollers.

In addition and preferably the annular element 2 should be mounted on the support rollers 4, 5 in a reversed condition, that is in such a manner that the operating surface 2a on which the longitudinal grooves will be produced will be located on the outer side of its circumferential extension.

A gear reduction means or other equivalent actuator means operates on one at least of the support rollers 4, 5 and is designed to drive the roller in rotation in order to impart a uniform translation motion to the annular element 2 in the direction of its longitudinal extension.

Preferably the annular element 2 is guided during its longitudinal translation by guide means generally identified at 7, acting on the opposite sides 2c, 2d of the annular element itself in order to prevent lateral displacements of the same.

To this end the guide means preferably comprises at least a thrust element 8 that, by virtue of the action of one or more springs 9 or equivalent spring means, acts by a spring thrust against one side 2c of the annular element 2.

In addition, provision is also made for a fixed locator 10 acting on the second side 2d of the annular element 2 for counteracting the action of the thrust element 8.

Apparatus 1 also comprises cutting means generally identified by 11, designed to act on the operating surface 2a of the annular element 2 for producing a number of grooves 12 extending parallelly over the whole longitudinal extension of the annular element itself.

In accordance with the present invention, the cutting means 11 comprises one set of knives 13 disposed parallelly in side-by-side relation according to a predetermined interval and simultaneously movable preferably in the direction of their longitudinal extension from a rest position in which, as shown in FIG. 1, they are spaced apart from the annular element 2, to a cutting position in which, as shown in FIG. 2, they penetrate into the operating surface 2a of the annular element 2 by a predetermined amount and according to an inclined direction relative to the normal of the operating surface itself.

In greater detail, the first knives 13 act in the region of the first support roller 4 so that the surface of the latter can be used as a rigid support for facilitating the cutting of the elastomeric material by the knives.

Moreover, in the operating position knives 13 penetrate the elastomeric material of the operating surface 2 by a lower depth than the distance between the textile reinforcement layer 3 and the operating surface itself.

The first set of knives 13 operates in combination with a second set of knives 14 disposed parallelly in side by side relation according to a predetermined interval, equal to the distribution gap between the first knives 13. Also the second knives 14 are movable preferably in the direction of their longitudinal extension from a rest position in which they are spaced apart from the annular element 2 to a cutting position in which they penetrate into the operating surface 2a of the annular element by a predetermined amount and according to an inclined direction relative to the cutting direction of knives 13 belonging to the first set.

In greater detail, the second knives 14 are so arranged that in the cutting position they penetrate into the operating surface 2a in a direction symmetrical to the penetration direction of knives 13 into the operating surface itself.

In addition, the first and second knives 13 and 14 are positioned in such a manner that the notches 13a and 14a they produce in the section of the annular element 2a meet each other at the respective ends thereby giving origin to the longitudinal grooves 12.

In the example shown in FIG. 2, notches 13a and 14a also match in the region of the operating surface 2a.

Under this situation grooves 12 produced in the annular element 2 have a triangular profile and are separated from each other by ribs 15 of triangular profile too.

Advantageously, by suitably adjusting the cutting direction of knives 12, 13 and/or the depth of the notches 12a, 13a they produce, it is also possible to achieve grooves 14 and ribs 15 of different configurations and sizes.

By way of example, shown in FIG. 4 is a cross sectional view of a portion of an annular element in which, by reducing the angle of incidence of knives 13, 14 relative to the normal to the operating surface 2a, or by increasing the cutting pitch, or by decreasing the thickness of the annular element, grooves 12 of triangular profile separated by ribs 15 of substantially trapezoidal profile are obtained.

FIG. 1a shows the preferred structural configuration of the profile end 17 of knives 13, 14. As viewed therefrom, at said end one side 18a of the knife 13, 14 is advantageously provided with flats forming two symmetrically opposed inclined planes 19a, 19b. Said inclined planes define respective cutting edges 20a, 20b along the intersection lines with the second side 18b of the knife 13, 14.

During working the only edge carrying out the cutting is the one 20a facing away from the advance direction of the annular element 2. When said edge is worn out it is sufficient to reverse the position of knife 13, 14 in order to arrange the other edge 20b for the execution of the cutting operation, so that the efficiency of the knife 13, 14 is restored.

Operation of the apparatus according to the invention described above mainly as regards structure, is as follows.

First the flexible annular element 2 is mounted to the support rollers 4, 5 so that it can be subsequently driven in movement upon the action of the reduction means 6.

While in movement the annular element 2 is suitably guided between the thrust element 8 and the fixed locator 10 in order to keep a predetermined axial positioning on the support rollers 4, 5.

While the annular element 2 is moving horizontally the first set of knives 13 are displaced from the rest position to the cutting position. Under this situation, the first knives 13 are pushed into the operating surface 2a (FIG. 2) for producing one series of longitudinal notches 13a.

It is apparent that the above longitudinal notches 13a by effect of the orientation and movements imparted to the first knives 13, will extend parallelly to the section of the annular element 2 according to an inclined direction relative to the normal of the operating surface 2a and according to a lower depth than the distance between the textile reinforcing layer 3 and the operating surface itself.

When the annular element 2 has performed at least a complete revolution about its own axis with the knives 13 in the cutting position, the knives are brought back to the rest position in order to leave free space for the second knives 14 that in turn will be brought to the respective cutting position.

In this situation (FIG. 3) the second knives 14 too are pushed into the operating surface 2a and they will produce a second series of notches 14a, each of said notches 14a meeting one notch 13a of the first series.

In this way longitudinal grooves 12 are formed on the flexible element 2 and a scrap 16 of elastomeric material is consequently removed from the element 2.

Obviously the formation of the longitudinal grooves 12 comes to an end when the annular element 2 has performed at least a complete revolution about its own axis while the second knives 14 are in the cutting position.

At the end of the above operation, the second knives are again brought back to the rest position and the formation of the longitudinal grooves 12 comes to an end when the annular element 2 has performed at least a complete revolution about its own axis while the second knives 14 are in the cutting position.

At the end of the above operation, the second knives are again brought back to the rest position and the annular element 2 is disengaged from rollers 4, 5 and it will be subsequently reversed so that its operating surface 2a will be located on the inner side of its annular extension.

On that occation it will also be possible to separate the scrap 16 from the finished product thus obtained; if requested the cutting line of two knives may be extended besides the intersecting point to make easier or to guarantee the removal of the scrap 16. The flexible annular element 2 before being disengaged from the support rollers 4, 5 can also be submitted to the action of auxiliary cutting members not shown as known per se, designed to split it longitudinally over the whole circumferential extension thereof so as to obtain a plurality of splined belts of the desired width.

The present invention attains the intended purposes. It will be recognized in fact that the process and apparatus of the invention allow the production of grooves to be carried out by operating on a previously vulcanized elastomeric material, thereby eliminating all problems described in connection with known processes in which grooves are directly produced during the vulcanization step.

In addition, the removal of the elastomeric material by two separate cutting actions also eliminates problems connected with the impossibility of reducing the consequently the cost of the product is lower.

Since the cutting is carried out by two sets of knives operating separately from each other, it is no longer necessary to have a great number of tools at one's disposal, to be used by turn depending upon the type of belt to be manufactured. In fact the apparatus in question lends itself to be adapted for working any type of belt by merely adjusting the mutual positioning of the knives and the depth of the cuttings they execute.

Obviously many modifications and variations can be made to the invention as conceived, all of them falling within the scope of the inventive idea characterizing it.

In particular, the operation of the knives can optionally take place according to offset planes of movement, which brings about the possibility of executing the first and second notches 12a, 13a simultaneously.

We claim:

1. A process for producing splined driving belts, comprising the following steps:
    a) making a flexible annular element of an elastomeric vulcanized material having a flattened rectangular section with two major sides and incorporating at least one reinforcing layer extending parallel to the major sides of said section to a predetermined distance from an operating surface defined by at least one of said major sides along the length of the flexible annular element;
    b) mounting the flexible annular element to at least one support roller;
    c) moving the flexible annular element with a uniform movement in the direction of its length by rotation of said at least one support roller;
    d) pushing a first set of parallel knives, which are positioned to be equally spaced apart from each other, into said operating surface according to a first direction inclined relative to the operating surface and to a depth less than the distance between the textile reinforcing layer and the operating surface itself to define a first series of longitudinal cuts;
    e) moving the first set of parallel knives away from said annular element to a first rest position displaced from the operating surface;
    f) and subsequently pushing a second set of parallel knives which are positioned to be equally spaced apart from each other into said operating surface according to a second direction inclined relative to the first direction, said knives meeting each one of the first longitudinal cuts and defining a second series of longitudinal cuts whereby a series of grooves is formed on the operating surface;
    g) moving the second set of parallel knives away from said annular element to a second rest position displaced from the operating surface.

2. A process according to claim 1, including moving the first set of parallel knives in a direction parallel to the longitudinal extension of the knives.

3. A process according to claim 1, including moving the second set of parallel knives in a direction parallel to the longitudinal extension of the knives.

4. A process according to claim 1, including mounting the flexible annular element between two support rollers having parallel axes and being mutually spaced apart from each other.

5. A process according to claim 4, including slidably guiding the flexible annular element during movement thereof between a locating abutment and a spring thrust element acting on at least one rectilinear side of the annular element included between said support rollers.

6. An apparatus for manufacturing splined driving belts, said belts comprising a flexible annular element of vulcanized rubber having a flattened rectangular cross section with two parallel major sides, one major side being a working surface and incorporating at least one textile reinforcing layer extending parallel to the working surface and at a predetermined distance therefrom; said apparatus comprising
    at least one support roller for engaging said flexible annular elements,
    actuator means for driving in rotation said at least one support roller so as to move the flexible annular element in the direction of its longitudinal extension;
    cutting means for acting on the operating surface of the annular element in order to produce a number of parallel grooves extending over the whole longitudinal extension of the annular element itself, said cutting means comprising:
        i) a first set of parallel knives disposed in side by side relation;
        ii) first means for simultaneously moving the first set of parallel knives from a first rest position in which they are spaced apart from the annular element to a first cutting position in which they penetrate into the working surface of the annular element by a predetermined amount and at an inclined direction relative to said working surface;
        iii) a second set of parallel knives disposed in side by side relation;
        iv) second means for simultaneously moving the second set of parallel knives from a second rest position in which they are spaced apart from the annular element to a second cutting position in which they penetrate into the working surface of the annular element by a predetermined amount and according to an inclined direction relative to the cutting direction of the first set of knives, said second set of parallel knives acting on the working surface after the first set of parallel knives is brought back to the first rest position.

7. An apparatus according to claim 6, including means for mounting the knives of the first and second sets to be movable in the direction of their longitudinal extension.

8. An apparatus according to claim 6, including means for mounting the knives of the first and second sets to penetrate into said working surface according to respective symmetrical paths.

9. An apparatus according to claim 6, including means for moving the knives of the first and second sets to penetrate into said working surface to a lesser depth than the distance between said reinforcing layer and the working surface.

10. An apparatus according to claim 6, comprising two support rollers having parallel and mutually spaced apart axes, between which the flexible annular element is operatively engaged.

11. An apparatus according to claim 10, further comprising guide means acting upon opposite longitudinal sides of the annular element over a length included between said support rollers in order to prevent the annular element from lateral displacement.

12. An apparatus according to claim 11, wherein said guide means comprises at least one thrust element operating against and biased toward one side of the annular element and at least one fixed locator acting on a second side of the annular element in order to counteract the action of said thrust element.

13. An apparatus according to claim 6, wherein each knife of the first and second sets is provided with flats at one end and on one side thereof lying at two inclined and symmetrically opposed planes, each of said flats being positioned to form a corresponding cutting edge along the intersection line with a second side of the knife.

* * * * *